(12) United States Patent
Ishihara et al.

(10) Patent No.: US 7,832,929 B2
(45) Date of Patent: Nov. 16, 2010

(54) LINEAR MOTION GUIDE UNIT

(75) Inventors: Toyohisa Ishihara, Mino (JP); Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 658 days.

(21) Appl. No.: 11/407,230

(22) Filed: Apr. 20, 2006

(65) Prior Publication Data

US 2006/0269176 A1 Nov. 30, 2006

(30) Foreign Application Priority Data

May 30, 2005 (JP) ............................ 2005-157525

(51) Int. Cl.
*F16C 29/06* (2006.01)

(52) U.S. Cl. ........................................ 384/43

(58) Field of Classification Search .................. 384/45, 384/43

See application file for complete search history.

(56) References Cited

U.S. PATENT DOCUMENTS

| 6,729,761 B2 * | 5/2004 | Matsui et al. .................. 384/45 |
| 2002/0018602 A1 * | 2/2002 | Kato et al. .................... 384/45 |

FOREIGN PATENT DOCUMENTS

| EP | 543571 A2 * | 5/1993 |
| JP | 60-256619 A | 12/1985 |
| JP | 1-126422 A | 5/1989 |
| JP | 6-54129 B2 | 7/1994 |
| JP | 3008835 | 1/1995 |

* cited by examiner

*Primary Examiner*—Richard W Ridley
*Assistant Examiner*—Alan B Waits
(74) *Attorney, Agent, or Firm*—Browdy and Neimark, PLLC

(57) ABSTRACT

An end cap in the present linear motion guide unit is made up of an end cap major part and a spacer part, which, once assembled, define a turnaround passage between them to make sure of smooth running of the rolling elements. Especially, the turnaround passage in the end cap when viewed in the sliding direction of the slider is constituted with a curved route whose radius of curvature is constant, which extends from a center (Ok) of a load race to a center (Or) of a return passage, with making a detour to clear an upper edge of a track rail. A carriage of the slider has widthwise opposing return passages lying biased more sidewise inwards or centerward than load races so as to make an interval or span (Pr) between the return passages less than a sidewise interval or span (Pk) between the load races. The curved route whose radius of curvature is constant, when viewed in the sliding direction of the slider, is arced over a semicircular range of 180 degrees.

2 Claims, 9 Drawing Sheets

(a)

(b)

LINEAR MOTION GUIDE UNIT

FIELD OF THE INVENTION

The present invention relates to a linear motion guide unit mainly composed of a track rail made thereon with a raceway groove, and a slider allowed to fit over the track rail to move relatively to the track rail through more than one rolling element.

BACKGROUND OF THE INVENTION

Conventionally, there are well known the linear motion guide unit in which a slider fits over or conforms to a track rail rectangular in transverse section for sliding movement relatively to the track rail by virtue of more than one rolling element. The linear motion guide units of the type recited earlier have been employed extensively in machinery in various fields such as assembling machines, semiconductor manufacturing apparatus, inspection/measurement instruments, and so on.

Meanwhile, modern linear motion guide units have been especially required more shrinking in construction even with ensuring high precision and accompanying reduced maintenance for lubrication. The linear motion guide units have been further needed to make smooth reciprocating motion to live up to high sliding velocity and high cyclic operation of the machines. With the linear motion guide units used in advanced machines, the slider is needed to travel with much smoothness even on the track rail lying in a vertical position or posture other than the common horizontal posture. The slider in the linear motion guide unit in general has forward and aft end caps made therein with turnaround passages, which are arranged to take a detour around any upper edges of the track rail to introduce the rolling elements from a load-carrying race on both sides of the track rail into a return passage lying biased more sidewise inwards than the race so as to make the slider small in widthwise dimension.

Advanced machines of the sort as stated earlier, nevertheless, look for linear motion guide units able to make much higher sliding motion and higher cyclic operation, even with accompanying more reduced maintenance for lubrication.

In the commonly assigned Japanese Patent Laid-Open No. S60-256619, there is disclosed a linear motion guide unit in which a slider is especially made reduced in widthwise measurement thereof. With this prior linear motion guide unit recited now, the track rail is made on both sides thereof with raceway groves extending lengthwise of the track rail, one on each side, while the slider is composed of a carriage and forward and aft end caps, the carriage being provided therein with return passages in a way a return passage lying biased more sidewise inwards than the rolling elements in the load-carrying race at a height over the rolling elements, and the end caps being made on their inward surfaces with turnaround passages in a widthwise symmetrical fashion. With the linear motion guide unit constructed as stated earlier, the rolling elements rolling through the load-carrying area gradually shift to a sidewise outward ingress of the associated turn-around, then following a U-shaped track to reach the associated return passage out of the turnaround passage.

Another linear motion guide unit having a slider reduced in widthwise measurement is disclosed in another commonly assigned Japanese Patent Laid-Open No. H01-126422. With this prior linear motion guide unit, the turnaround passage in an end cap is made in the form of a curved groove lying perpendicular to an axis extending in a sliding direction of a major carriage in the slider. The curved groove is cut in the end cap in a way the radius of curvature thereof is constant and also the center thereof lies on a straight line extending through the centers of sequential rolling elements in the load-carrying race and in parallel with the lengthwise side of the track rail on which the raceway groove is cut deep. The return passage is placed in the carriage at a level as high as the highest point of the curved geometry of the turnaround passage. Confronting surfaces of the track rail and the carriage are made into inclines on which the raceway grooves are cut to define the load race between them. As an alternative version, there is disclosed another linear motion guide unit in which the raceway groove to form the load race is cut in the perpendicular side on the track rail and the turnaround passage is made in the curved geometry whose center is placed on the perpendicular line passing through the center of the rolling element and whose radius of curvature is constant. The return passage is made in the carriage at a level as high as the highest point of the curved geometry of the turnaround passage in such a way lying directly over the rolling elements in the load-carrying area.

With the linear motion guide unit made slim or narrow in widthwise measurement as stated earlier, the turnaround passage in the end cap is made to have a curve whose radius of curvature (R) is constant whereas the return passage has to be placed at a level as high as the highest point of the turnaround passage. This prior construction needs to make the track rail trapezoidal in transverse section. Otherwise, the track rail made to have perpendicular sides requires providing the return passage lying directly over the rolling elements in the load-carrying area.

A further another linear motion guide unit is disclosed in Japanese Utility Model Registration No. 3008835, in which the combination of a slider major body and end caps is guided along a linear rail with less noise by virtue of successive balls rolling through between the rail and the slider major body. With the prior linear motion guide unit recited now, a non-loaded return passage is made in the slider major body over the load-carrying raceway groove while a pair of U-shaped turnaround grooves is made inside the end cap. Each U-shaped turnaround groove is made semicircular in transverse section and made up of a curved area and a linear area, which are allowed to receive five balls therein. The turnaround groove completes the circulating circuit in a way that the balls enter the U-shaped turnaround groove out of the load race, followed by making a turn up to 180 degrees along the turnaround groove, and reaching a central location in the end cap to roll into the associated non-loaded return passage. Moreover, the end cap fits along the U-shaped turnaround groove thereof over a cap plate that has grooves semicircular in transverse section thereof to cooperate with their associated U-shaped turnaround grooves in the end cap. The semicircular grooves in the end plate have inverse angles of circular contour at their semicircular edges and their central openings.

The linear motion guide unit discussed now, although somewhat helpful in smooth circulation of the balls, would pose a problem that the slider itself is apt to get wobbling or bumpy in sliding travel because the turnaround groove made up of the semicircular area and the linear area comes to have many changes or bents in the turnaround passage, which might thwart smooth rolling of the balls. With the U-shaped turnaround groove in which semicircular grooves joined together, moreover, the trace of the centers of the rolling balls comes to fall in line with the joint line of the semicircular grooves, so that the balls cannot be guided with steadiness. The inverse angles of circular contour in the prior linear motion guide unit recited as stated earlier, because of getting mutual fit area of the end cap with the cap plate edgy contour, adversely make the circulating circuit discontinuous or irregular, interfering smooth circulation of the balls.

A further another commonly assigned Japanese Patent Publication No. H06-54129 discloses a rolling-contact bearing for linear motion system, in which rolling elements are allowed to roll through from a linear area into a curved area and vice verse in the circulating circuit, while shifting in a direction along the circulating circuit at some changes or bents.

SUMMARY OF THE INVENTION

The present invention, therefore, has as its primary object to overcome the problem as described just above and to provide a linear motion guide unit in which there is a constructional feature in an end cap. More particular, the present invention is envisaged the provision of a linear motion guide unit in which a turnaround passage is made into a curved contour so as not to interfere rolling travel of a rolling element in spite of a slider being made compact or slim in widthwise measurement thereof, making it possible to guide the rolling element with high velocity and smoothness as allowed as possible.

The present invention is concerned with a linear motion guide unit; comprising a track rail provided on both lengthwise sides thereof with first raceway grooves, and a slider that fits over and conforms to the track rail to move lengthwise along the track rail; wherein the slider is comprised of a carriage made thereon with second raceway grooves in opposition to the first raceway grooves to define load-carrying races between them and also made therein with return passages extending in parallel with the races, end caps to be attached to forward and aft ends of the carriage, the end caps being each made therein with turnaround passages communicated with the races and the return passages, and more than one rolling element of ball allowed to roll through a circulating circuit made up of the race, return passage and turnaround passage;

wherein the return passages lie biased more widthwise center-ward than the races so as to make an interval between the return passages less than a widthwise interval between the races; and wherein the turnaround passages are each formed in a curved route whose radius of curvature is constant, the curved route extending from a center of the associated race to a center of the associated return passage, with making a detour to clear an upper edge of the track rail when viewed in a sliding direction of the slider.

In one aspect of the present invention, there is disclosed a linear motion guide unit in which the curved route whose radius of curvature is constant is arced over a semicircular range of 180 degrees when viewed in the sliding direction of the slider.

In another aspect of the present invention, there is disclosed a linear motion guide unit in which the end cap is made up of an end cap major part and a spacer part that fits into the end cap major part, and wherein the spacer part is grooved to form curved inward halves spaced widthwise apart from one another for the turnaround passages while the end cap major part is grooved to form curved outward halves spaced widthwise apart from one another for the turnaround passages.

In another aspect of the present invention, there is disclosed a linear motion guide unit in which the end cap major part is made therein with mating depressions while the spacer part is made therein with mating edges adapted to fit into the mating depressions, the mating edges and depressions being made rounded at their ends joining together with the associated return passage and the associated load race, and wherein the turnaround passages are defined between the curved inward halves in the spacer part and the curved outward halves in the end cap major part, which come into opposition to one another after the end cap major part has once assembled together with the spacer part in a way the mating edges has fit into the mating depressions.

In another aspect of the present invention, there is disclosed a linear motion guide unit in which the carriage is made therein with a hole to fit over a tubular member impregnated with lubricant while the end caps are each made with an integral spigot to fit into the tubular member in a way coming into abutment against any one of the opposite ends the tubular member, thereby making the return passage.

In another aspect of the present invention, there is disclosed a linear motion guide unit in which the end cap major part has a lubrication port while the spacer part has a lubricant path in opposition to the lubrication port, and wherein the lubricating path extends to hug around the spigots, reaching the turnaround passages.

In another aspect of the present invention, there is disclosed a linear motion guide unit in which any one of the outward circular groove in the end cap major part and the inward circular groove in the is cut somewhat larger in depth with respect to a middle line of the turnaround passage while the other is made just less in depth than the middle line of the turnaround passage so that the outward circular groove cut somewhat larger in depth makes it easier to guide the rolling elements in a circulating manner.

In a further another aspect of the present invention, there is disclosed a linear motion guide unit in which the end cap is made of synthetic resin stained blue different in color from the carriage.

With the linear motion guide unit constructed as stated earlier, especially, the turnaround passage in the end cap when viewed in the fore-and-aft direction or the sliding direction of the slider is constituted with a curved route whose radius of curvature is constant, which extends from a center of a load race to a center of a return passage, with making a detour to clear an upper edge of a track rail. This constructional feature makes sure of most smooth rolling motion of the rolling elements through the turnaround passages to allow the slider to travel on the track rail without getting wobbling or bumpy in sliding movement, despite the widthwise opposing return passages lying biased more sidewise inwards or center-ward than load races so as to make an interval or span between the return passages less than a sidewise interval or span between the load races. Thus, the linear motion guide unit of the present invention can work with most high velocity and high tact or cyclic performance. Moreover, lubricant applied smoothly into the return passages through the end caps lubricates the rolling elements with accompanying reduced maintenance for lubrication.

DETAILED DESCRIPTION OF THE PREFERRED EMBODIMENTS

Figure 1:
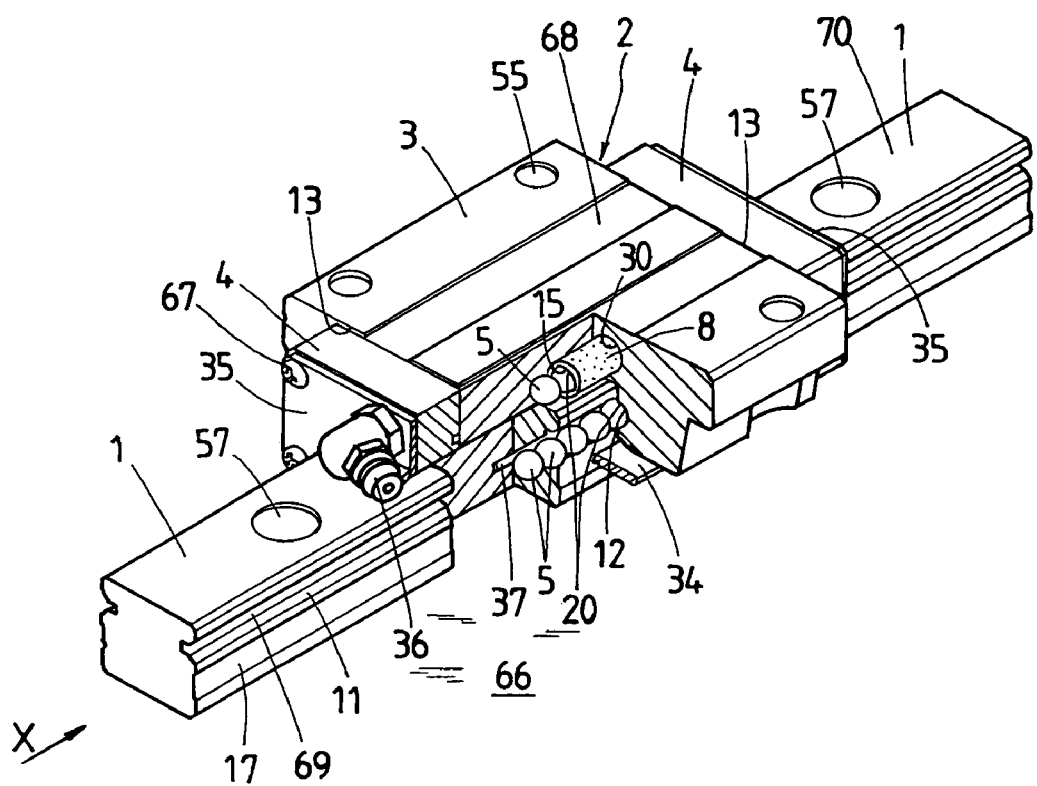
FIG. 1 is a partially cutaway view in perspective showing a preferred embodiment of a linear motion guide unit in accordance with the present invention.

A preferred embodiment of a linear motion guide unit according to the present invention will be explained hereinafter in detail with reference to the accompanying drawings. The linear motion guide unit according to the present invention is well adapted for use in any relatively sliding components in machinery as diverse as semiconductor fabricating equipment, assembly machines, inspection instruments, medical instruments, measurement instruments, and so on. With the linear motion guide unit of the present invention, in spite of the slider 2 being made compact or slim in widthwise measurement thereof perpendicular to a lengthwise direction of the track rail 1, rolling elements 5 may be expected to roll through with smoothness to make certain of smoothly sliding travel of a slider 2 along a track rail 1. Thus, the linear motion guide unit constructed according to the present invention figures out to meet with precise position control of the slider, shrinking down in construction, smooth reciprocating motion of the slider, and other desirable operating performances, and further ensures positive maintenance-free operation regarding lubrication for rolling elements even when used in the various machines as recited above under high-speed, high-cyclic operating condition.

With the linear motion guide unit of the present invention, a turnaround passage 14 made in an end cap 4 is defined between an end cap major part 7 and a spacer part that fits snugly into the end cap major part 7. The turnaround passage 14 is controlled in geometry to keep a circular clearance around the rolling element 5 uniform overall the entire area of the turnaround passage 14, making sure of rolling operation with high precision and high velocity of rolling elements 5 throughout a circulating circuit.

The linear motion guide unit, as shown in FIG. 1, is principally comprised of an elongated track rail 1 rectangular in transverse section and made on lengthwise sides 17 thereof with first raceway grooves 11, one on each side, and a slider 2 that fits over or conforms to the track rail 1 for sliding movement by virtue of more than one rolling element 5 or ball, relatively to the track rail 1. The linear motion guide unit of the present invention is envisaged the provision of a model narrowing widthwise, in which a carriage 3 of the slider 2 is made therein with widthwise opposing return passages 15 lying biased more sidewise inwards or center-ward than load races 16 so as to make an interval or span (Pr) between the return passages 15 less than a sidewise interval or span (Pk) between the load races 16. The slider 2 has second raceway grooves 12 extending in opposition to the first raceway grooves 11 on the track rail 1 to define the load-carrying races 16 between them where the rolling elements 5 are allowed to roll through there. The track rail 1 is provided therein with some holes 57 that are used to fasten the track rail 1 to any basement 66 of other components including stationary bed, a machine bed, other counterpart, and so on.

The slider 2 is mainly composed of the carriage 3 made thereon with raceway grooves 12 and therein with return passages 15, the end caps 4 arranged on forward and aft ends 13 of the carriage 3, one to each end, and formed therein with the paired turnaround passages 14, and end seals 35 attached to outward end surfaces of the end caps 4. The carriage 3 is made up of a ceiling portion 58 facing on an upper surface 70 of the track rail 1 and widthwise opposing side portions 59 extending downwards along the sidewise edges of the ceiling portion 58 to define an inverted U-shape recess 64 together with the ceiling portion 58 when viewed in transverse section, the side portions 59 being made on their inward surfaces with the raceway grooves 12. The end cap 4 is also made in conformity with the carriage 3 and comprised of a ceiling area 60 and widthwise opposing side areas 61 extending downwards along the sidewise edges of the ceiling area 60 to define an inverted U-shape recess 65 together with the ceiling area 60 when viewed in transverse section. In the ceiling area 60 of the end cap 4, there are provided paired fore-and-aft bores 30 in preparation for the return passages 15 to allow the rolling elements running through there.

A lower seal 34 is disposed underneath the slider 2. The end cap 4 is secured together with the end seal 35 to the carriage 3 with fastening screws 67 driven into threaded holes 54. The carriage 3 is made on a top surface 68 thereof with threaded holes 55 that are used to install any object including various instruments, works, and so on thereto. On an outward surface of any one of the end seals 35, there is provided a grease nipple 36. Any one of the end caps 4 is provided with a lubricant path 31 to feed lubricant from a grease nipple 36 into both the turnaround passages 14 inside the associated end cap 4 and the return passages 15 inside the carriage 3. The slider 2 has a retainer band 37 that fits into a fore-and-aft trench 69 cut deep in the raceway groove 11 on the track rail 1 to retain the rolling elements 5 to thereby prevent the rolling elements 5 from falling out of the slider 2. With the slider 2 constructed as stated earlier, there are provided a circulating circuit to allow the rolling elements 5 running through there. The circulating circuit includes the load-carrying race 16 defined between the slider 2 and the track rail 1, the forward and aft turnaround passages 14 connected at their one ends thereof with forward and aft ends of the load-carrying race 16, and the return passage 15 connected with other ends of the turnaround passages 14. Thus, the rolling elements 5, or balls, in the slider 2 run through a circulating circuit 20, that is the load area of the load-carrying race 16 to a non-loaded area inclusive of the return passage 15 and the forward and aft turnaround passages 14 in the end caps 4 in a circulating manner as the slider 2 moves relatively to the track rail 1.

Figure 16:
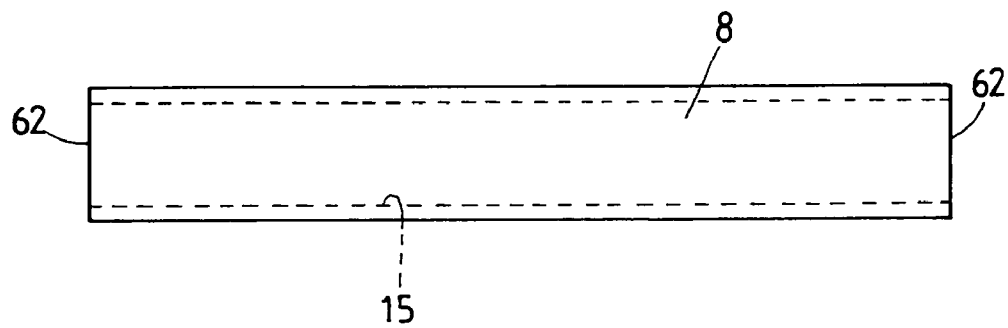
FIG. 16 is a view in front elevation of a tubular member used in the linear motion guide unit of FIG. 1.
Figure 17:
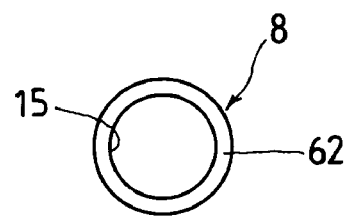
FIG. 17 is a view in side elevation of the tubular member of FIG. 16.

The linear motion guide unit of the present invention is further envisaged accompanying reduced maintenance or maintenance-free operation for lubrication. The carriage 3 is made therein with a pair of fore-and-aft holes 30 extending parallel not only with each other but also with the raceway grooves 12 cut on the carriage 3. A tubular member 8 made of cellular structure impregnated with lubricant fits into the fore-and-aft hole 30 to form the return passage 15 to get the rolling elements 5 rolling smoothly through there with lubricating the rolling elements 5. Referring to FIGS. 16 and 17, there is shown the tubular member 8 to fit into the fore-and-aft hole 30 inside the carriage 3. The tubular member 8 is made of a sleeve constructed by the sintering of fine powders of ultra-high molecular weight polyethylene. The resulting sintered resinous compact has many continuous open cells left among particles pressed and sintered. Thus, the compacts readily soak up lubricant. The tubular member 8 has an inside hole for the provision of the return passage 15, which is somewhat larger in diameter than the rolling elements 5. The tubular member 30 has an outside surface circular in transverse section, which has an outside diameter to allow the tubular member 8 to loose fit into the fore-and-aft hole 30 in the carriage 3 with leaving a clearance between them. With the version disclosed here, the tubular member 8 has the inside hole made circular in cross section in conformity with the rolling element of ball 5. Thus, the tubular member 8 is made rich in stiffness and capable of soaking up, retaining and getting oozing lubricant.

Figure 9:
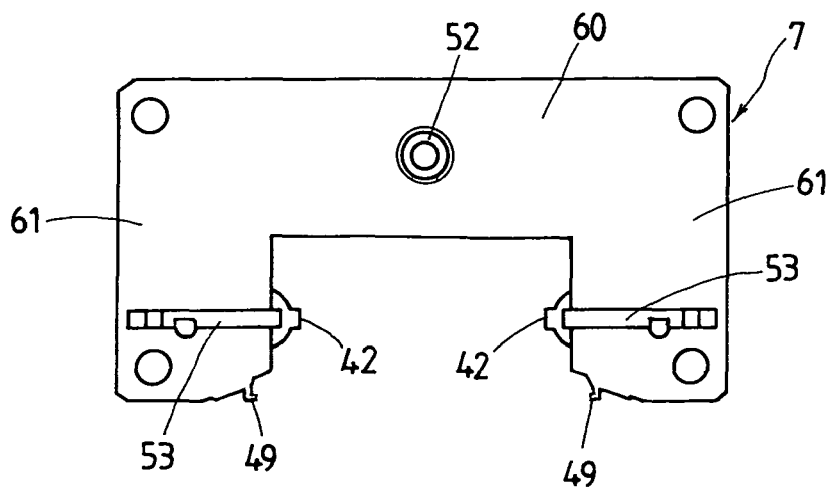
FIG. 9 is a view in front elevation of the end cap major part of FIG. 6.
Figure 10:
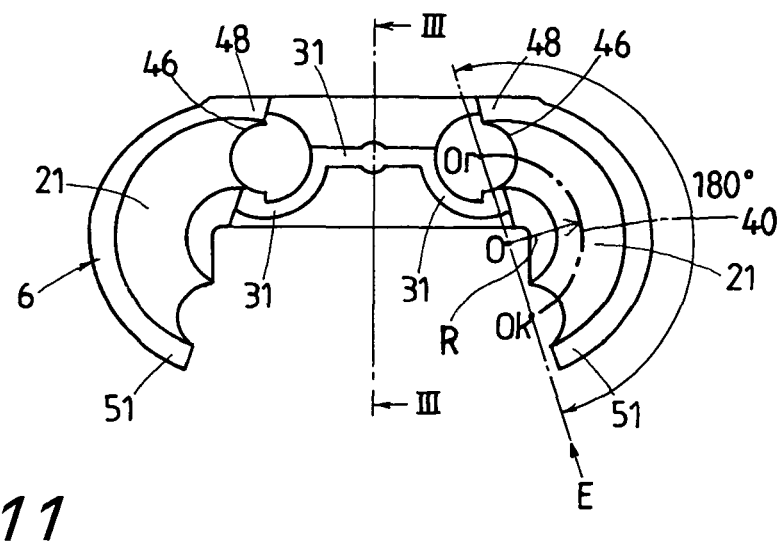
FIG. 10 is a view in front elevation of the spacer part of FIG. 5.

The linear motion guide unit of the present invention especially features the construction of the end cap 4 having the turnaround passages 14 therein. The turnaround passage 14 is defined by a curved route 10 in which any bent point is made as few as possible to ensure smooth circulation of the rolling elements 5 through the turnaround passages 14. Further the curved route 10 at areas mating with anyone of the return passage 15 and the load race 16 is made so highly accurate as to make smooth connections with the return passage 15 and the load race 16, helping minimize any variance in the circulating direction of the rolling elements 5. The end cap 4 is made up of an end cap major part 7 and a spacer part 6 that fits snugly into the end cap major part 7 to form the turnaround passage 14 between them. With the end cap 4 constructed as stated earlier, the end cap major part 7 comes into accurate mating relation with the spacer part 6 in a way that an upper central recess 43 in the end cap major part 7 fits over a central mating portion 44 of the spacer part 6 while sidewise spaced depressions 23 in the end cap major part 7 fit over sidewise opposing mating edges or fringes 24 of the spacer part 6. The end cap major part 7 is made therein with pins 39 to fit into locating holes 56 in the carriage 3, other holes 38 to accommodate the fastening screws 67 therein, lugs 49 to keep the lower seal 34 in position, grooves 53 (see FIG. 9) to keep the retainer band 37, a threaded port 52 to receive the grease nipple 36 and raised portions 42 to scoop up the rolling elements 5 as they run through there.

In the end cap 4, there is provided a pair of turnaround passages 14 spaced widthwise apart from one another and each designed in construction to allow the rolling elements 5 circulating as smooth as possible through the turnaround passages 14. To this end, the turnaround passage 14 in the end cap 4, as opposed to the prior version, is made to have a curve whose radius of curvature (R) is constant when viewed in a fore-and-aft direction of the slider 2 or the sliding direction (X) in FIG. 1, thereby making any bent points less in number and making it easier to figure out the circulating circuit with accuracy. Especially, the turnaround passage 14 when viewed in the fore-and-aft direction or sliding direction of the slider 2 is first constituted with the three-dimensional curved route 10 whose radius of curvature (R) is constant, which extends from a center (Ok) of the load race 16 to a center (Or) of the return passage 15, with making a detour to clear an upper edge 18 of the track rail, around a center (O) lying midway between the center (Ok) of the load race 16 and the center (Or) of the return passage 15. Second, the curved route 10 whose radius of curvature (R) is constant, when viewed in the sliding direction of the slider 2, is arced over a semicircular range of 180 degrees, thereby making it easier to figure out the circulating circuit 20 with accuracy. The turnaround passage 14 defined between the end cap major part 7 and the spacer part 6 mating with one another would not inevitably elude any error that might occur in assembly of the mating parts. To cope with this, the turnaround passage 14 designed according to the present invention is made in the curved configuration whose radius of curvature (R) is as constant as possible to make the bent or angled points less in number, thereby getting out of virtually any factors that might otherwise affect negatively the running performance of the rolling elements 5.

Next, the turnaround passage 14, return passage 15 and the load-carrying race 16 to complete the circulating circuit 20 will be recited below with reference to FIG. 2.

Figure 2:
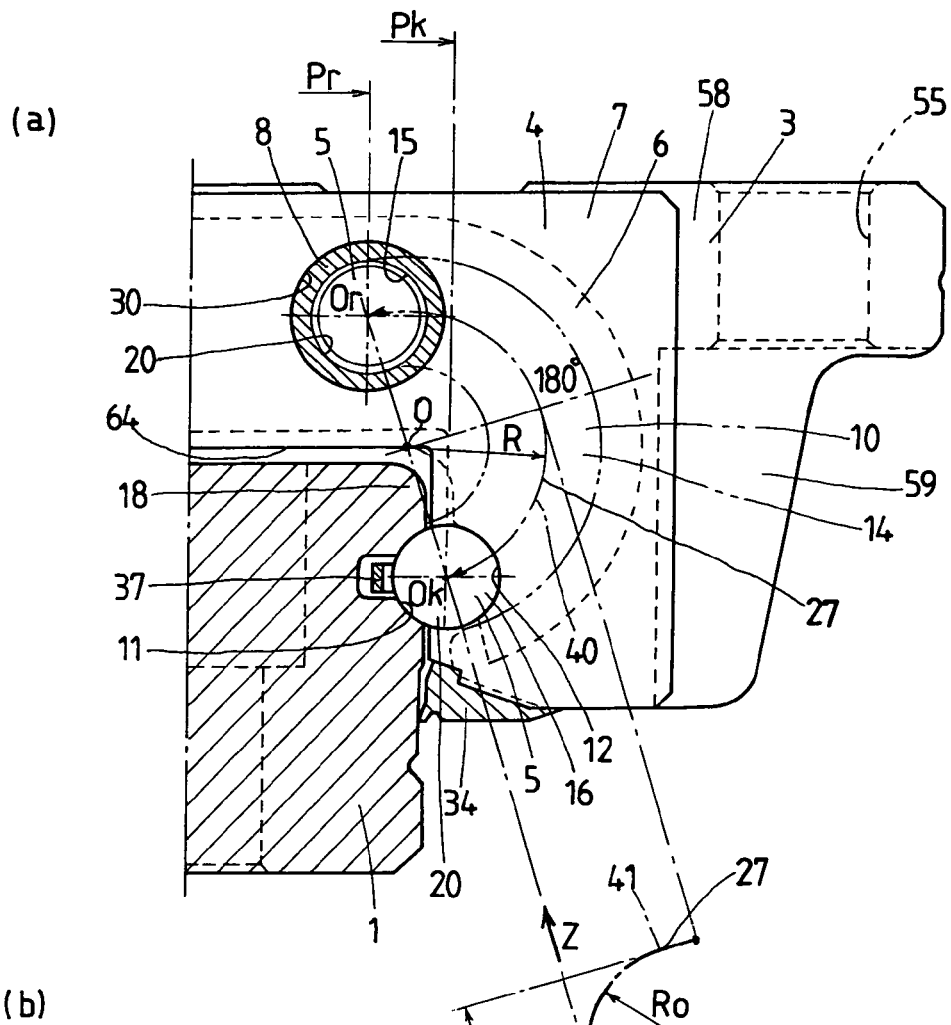
FIG. 2 is a view in front elevation, partially transverse section, showing only half of the linear motion guide unit of FIG. 1, where the illustration labeled (a) is an explanatory view of a circulating circuit visible in a sliding direction with arrowhead (X) while the illustration labeled (b) is a schematic explanatory view to show a central trace of the circulating circuit when viewed in a direction with arrowhead (Z) in the illustration (a), some straight-line areas being shown omitted partially.
Figure 2:
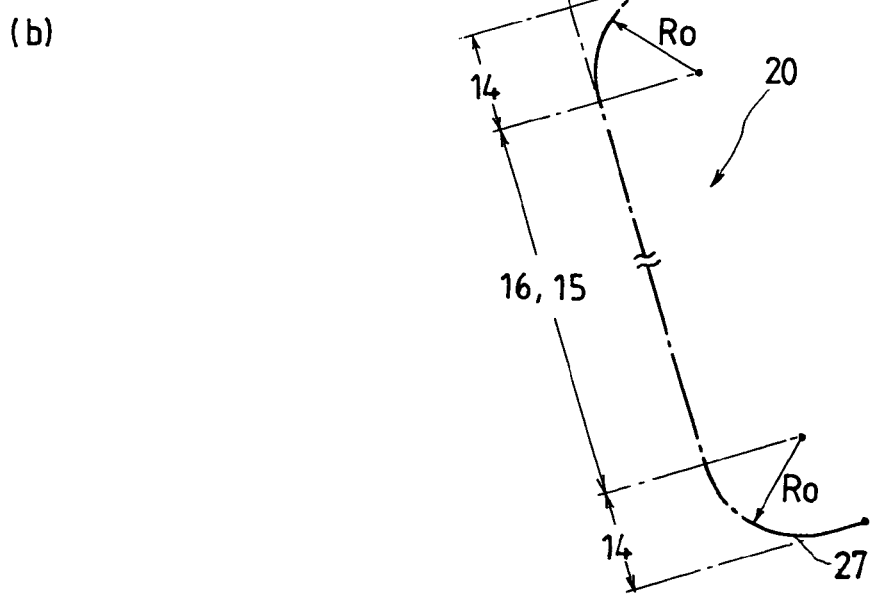
Figure 3:
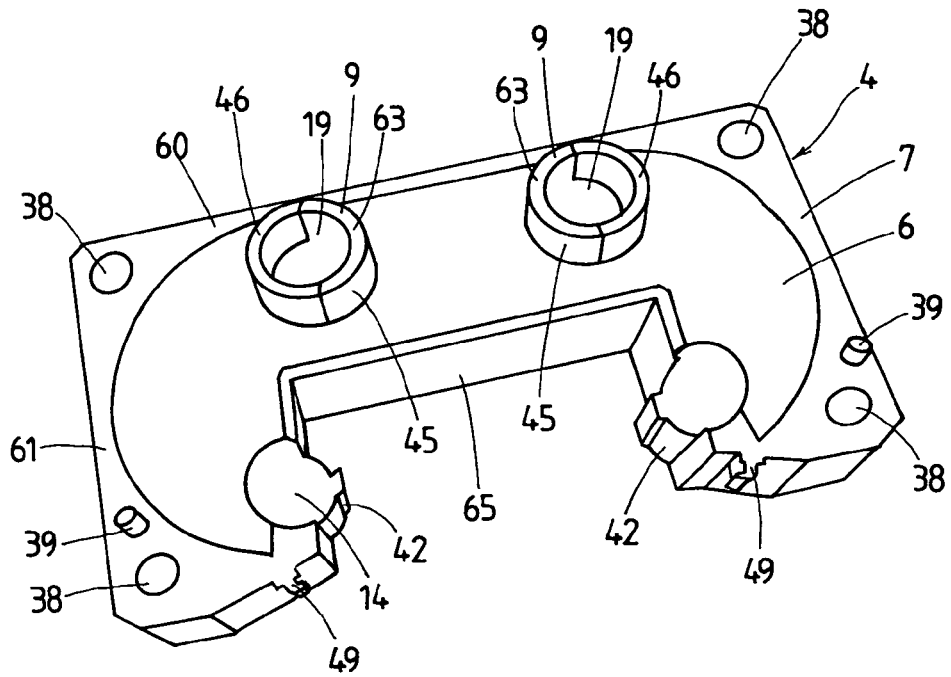
FIG. 3 is a view in perspective of an end cap top taken apart from the linear motion guide unit of FIG. 1 and seen from the back thereof facing a carriage of a slider.

When viewing in a Z-direction in FIG. 2(a) or a direction lying on a straight line joining together the center (Ok) of the load race 16 and the center (Or) of the return passage 15, a trace 41 of center of the circulating circuit 20 is considered as depicted in FIG. 2(b). The circulating circuit 20 is made up of the linear load-carrying race 16, the return passage 15 lying in parallel with the load-carrying race 16, and the turnaround passages 14 each of which is communicated at opposite ends thereof with the associated load-carrying race 16 and return passage 15, the turnaround passage being made in the curved route 10 arced over 180 degrees with constant radius of curvature (R) when viewed in the X-direction of FIG. 1 while arced over 90 degrees with constant radius of curvature ($R_O$) when viewed in the Z-direction of FIG. 2.

With the end cap 4 constructed as stated earlier, the end cap major part 7 is grooved deep on an inside surface thereof to form curved outward halves 22, 32 for the turnaround passages 14 while the spacer part 6 is grooved on an outside surface thereof to form curved inward halves 21, 33 for the turnaround passages 14 in opposition to the curved outward halves 22, 32 in the end cap major part 7. Thus, when the spacer part 6 fits into the end cap major part 7, the curved outward halves 22, 32 on the end cap major part 7 come into registry with the curved inward halves 21, 33 on the spacer part 6 to complete the three-dimensional curved routes 10 for the turnaround passages 14. In other words, the turnaround passage 14 mainly includes therein the curved route 10 whose radius of curvature (R) is constant, which is constituted with the curved outward half 22 on the end cap major part 7 and the curved inward half 21 on the spacer part 6 mating with each other. Opposite ends of the turnaround passage 14 to join with the load race 16 and the return passage 15 are especially constituted with the curved outward half 32 on the end cap major part 7 and the curved inward half 33 on the spacer part 6, which come into registry with each other and bend into their associated load race 16 and the return passage 15 to make smooth transit areas into the load race 16 and the return passage 15, thereby making it easier to provide the three-dimensional curved route 10 that allows the rolling elements 5 running with smooth into the load race 16 and the return passage 15 in the sliding direction of the slider 2.

The curved route 10 to provide the turnaround passage 14 in the present invention, as opposed to the prior two-dimensional curved route, is made in the tree-dimensional curved route comprised of a major area made up of the curved outward half 22 and the curved inward half 21 with constant radius of curvature (R) when viewed in the X-direction, and minor areas each made up of the curved outward half 32 and the curved inward half 33 with constant radius of curvature (R.sub.0) when viewed in the Z-direction. The turnaround passages 14 are defined with the curved outward halves 22, 32 on the end cap major part 7 and the curved inward halves 21, 33 on the spacer part 6, which are in opposition to one another to come into engagement with each other along their mating portions 25 including mating edges 24 and the mating depressions 23. When once the end cap major part 7 has fit over the spacer part 6 in a way the mating edges 24 of the spacer part 6 come into engagement with their associated mating depressions 23 of the end cap major part 7, the curved outward halves 22, 32 on the end cap major part 7 join together with the curved inward halves 21, 33 on the spacer part 6 to complete the turnaround passages 10 each of which has the opposite end areas made curved with the radius of curvature of a preselected (R.sub.0) to merge together with the return passage 15 and the load race 16, and the major middle area made arced with the radius of curvature of another preselected (R) between the opposite end areas. The turnaround passages 14 are made throughout in a uniform size that allows leaving slight clearances around the rolling elements 5.

In the linear motion guide unit of the present invention, there are constructional features in the mating arrangement between the end cap major part 7 and the spacer part 6.

Figure 4:
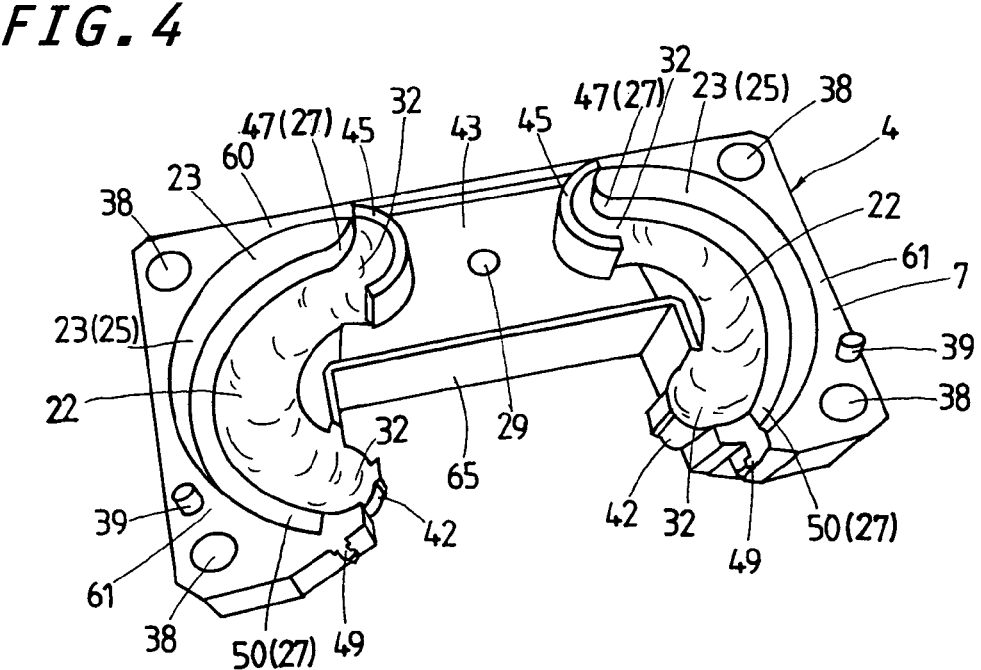
FIG. 4 is a view in perspective of an end cap major part in which a spacer part is shown taken apart to expose inside the end cap of FIG. 3.
Figure 5:
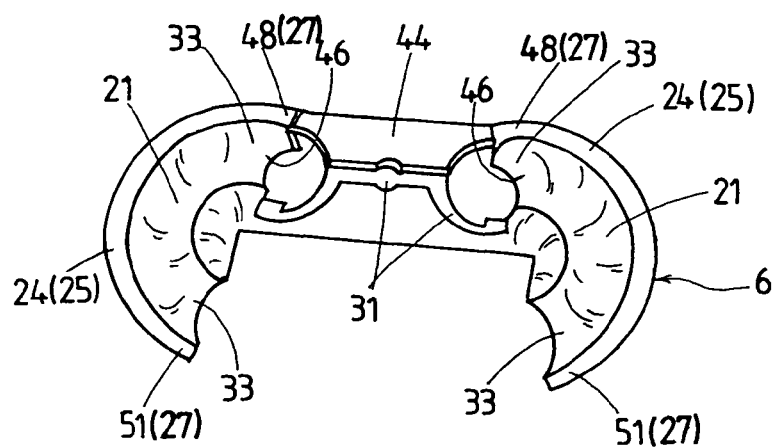
FIG. 5 is a view in front elevation of the spacer part disassembled from the end cap of FIG. 3.
Figure 6:
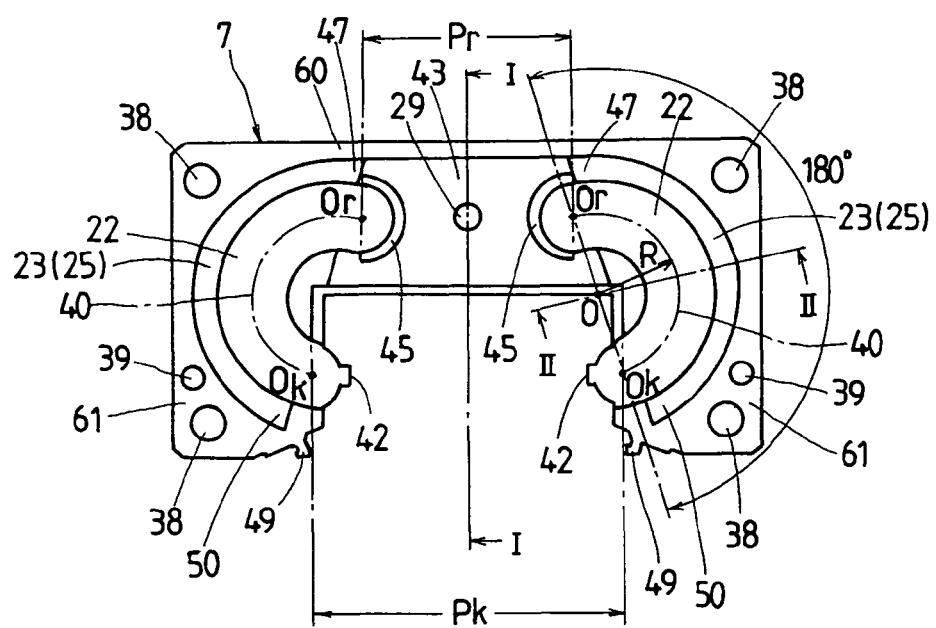
FIG. 6 is a view in rear elevation of an end cap major part in FIG. 4.

First, the mating portions 25 are each formed without lying across the middle line 40 of the turnaround passage 14, or the trace 41 of center of the circulating circuit 20. To this end, the mating portions 25 are rounded at both ends coming into connection with the load race 16 and the return passage 15, respectively. For example, as shown in FIG. 4, the end cap major part 7 includes a rounded mating depression 47 at the side of the return passage 15 (shown in FIG. 2) and a rounded mating depression 50 at the side of the load race 16 (shown in FIG. 2) and as shown in FIG. 5, the spacer part 6 includes a rounded mating fringe 48 at the side of return passage 15 and a rounded mating fringe 51 at the side of the load race 16. The rounded mating depression 47 and the rounded mating fringe 48 come into each other with a round fit, and the rounded mating depression 50 and the rounded mating fringe 51 come into each other with another round fit. Should the mating portions 25 extend across the middle line 40 of the turnaround passage 14 as opposed to the mating portions 25 formed without lying on the trace 41 of center of the circulating circuit 20, the passage has to be restricted in circular transverse section from a location where the mating portions 25 extend across the middle line 40. Nevertheless, such restriction would be impossible because of producing and molding aspects. Both the rounded mating fringes 48 on the side of the return passage 15 and the rounded mating fringe 51 on the side of the load race 16, moreover, make bent locations (R0) where any one linear route of the load race 16 and the return passage 15 transfers to the associated curved route 10, and vice verse. It is to be noted that the bent locations (R0) much affect the smooth circulation of the rolling elements 5.

Figure 7:
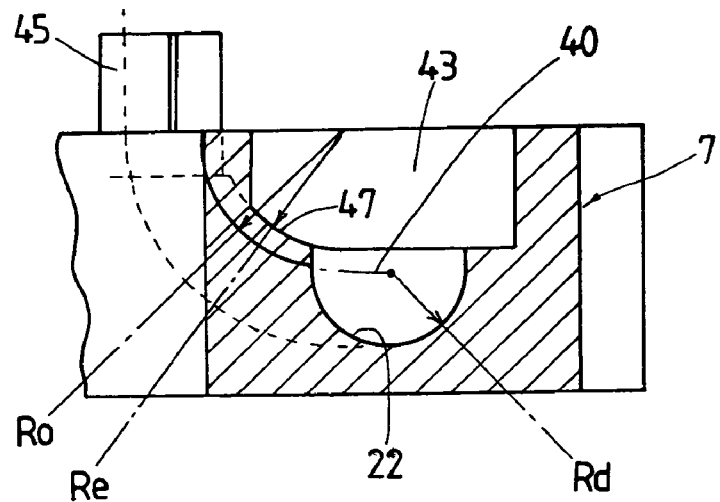
FIG. 7 is a view in partially transverse section of the end cap major part, the view being taken on a plane along the line II-II of FIG. 6.
Figure 8:
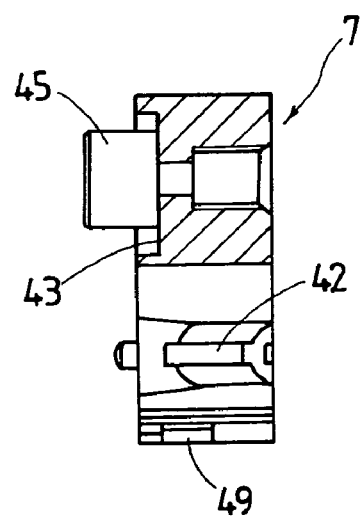
FIG. 8 is a view in transverse section of the end cap major part, the view being taken on a plane along the line I-I of FIG. 6.
Figure 11:
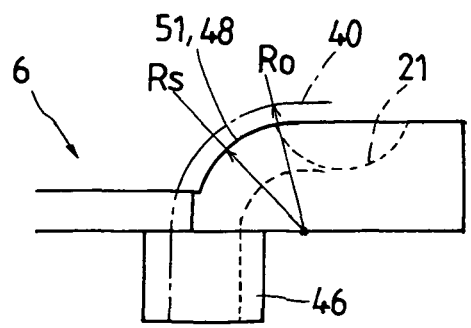
FIG. 11 is an illustration visible in an arrowhead (E) of the spacer part shown in FIG. 10.
Figure 12:
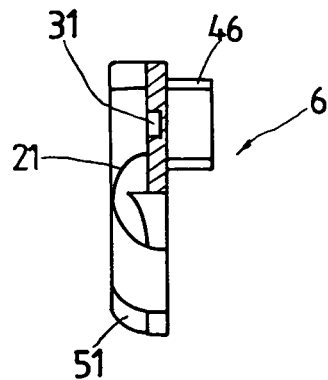
FIG. 12 is a view in transverse section of the spacer part, the view being taken on a plane along the line III-III of FIG. 10.
Figure 13:
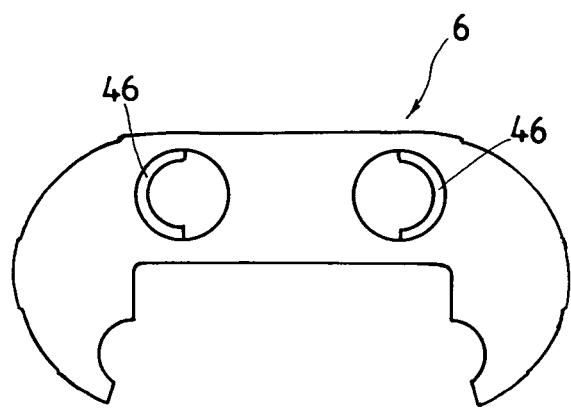
FIG. 13 is a view in rear elevation of the spacer part shown in FIG. 10.
Figure 14:
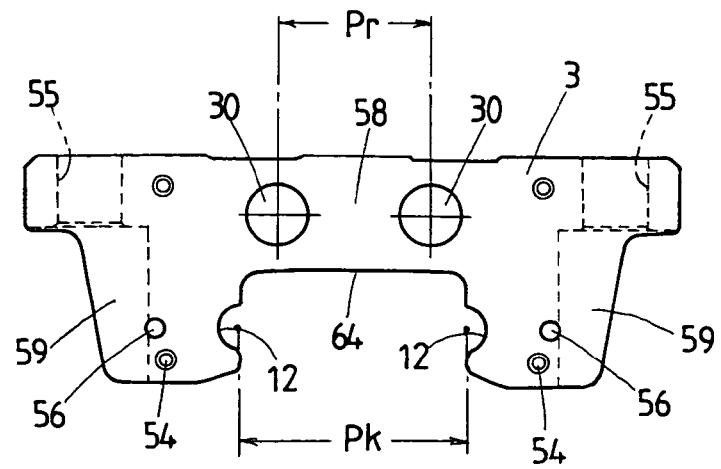
FIG. 14 is a view in front elevation of a carriage for the slider in the linear motion guide unit of FIG. 1.
Figure 15:
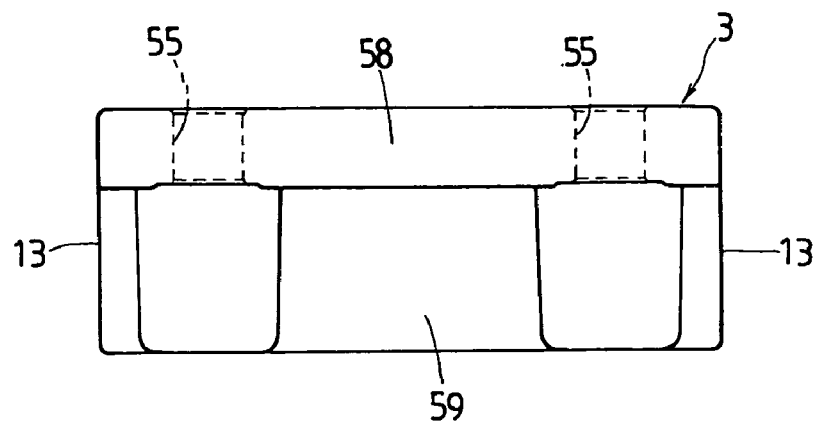
FIG. 15 is a view in side elevation of the carriage of FIG. 14.

Second, the curved outward half 22, or the outward circular groove 22, is made for the turnaround passage 14 inside the end cap major part 7 as shown in FIG. 7 while the curved inward half 21, or the inward circular groove 21, is made for the turnaround passage 14 inside the spacer part 6 as shown in FIG. 11. Any one of the outward circular groove 22 and the inward circular groove 21 is cut somewhat larger in depth with respect to the middle line 40 of the turnaround passage 14 while the other is made just less in depth than the middle line 40 of the turnaround passage 14. With the version of the turnaround passage 14 constructed as shown in FIG. 7, the outward circular groove cut somewhat larger in depth provides deep side walls to make it easier to guide the rolling elements 5 in a circulating manner, helping make sure of much steady circulation of the rolling elements.

The end cap 4 is made integrally with spigots 9 that provide return passage ends 19 to be merged into their associated return passages 15. The end caps 4 are secured to the carriage 3 in a way the spigots 9 come into integral connection with their associated return passages 15 to make certain of continuity of the turnaround passages 14 and the return passages 15, ensuring smooth circulation of the rolling elements 5. Each spigot 9 integral with the end cap 4 in the version recited here is especially made up of a semicircular spigot half 45 raised above the rear surface of the end cap major part 7 and a semicircular spigot half 46 or the counterpart raised above the rear surface of the spacer part 6, which joins together with the spigot half 45 of the end cap major part 7 to form a tubular spigot 9 for a part of the return passage 15. On the spigot halves 45 and 46, respectively, there are provided a circular surface continuing with the curved outward groove 32 inside the end cap major part 7 and another circular surface continuing with the curved outward groove 33 inside the spacer part 6. Moreover, the spigot 9 has an outside diameter to fit snugly into the fore-and-aft bore 30 in the carriage 3. A circular inside surface 28 of the spigot 9 is preferably made identical in diameter with the circular inside surface of the return passage 15 defined inside the tubular member 8 to make sure of smooth rolling motion of the rolling elements 5. The spigot 9 is made in a length thereof not less than a half the diameter of the rolling element 5 to make sure of a straight connection where the spigot 9 comes into abutment against any one of the opposite ends 62 of the tubular member 8, thereby getting out of virtually any influence that might otherwise affect negatively the running performance of the rolling elements 5.

With the linear motion guide unit of the present invention, the end cap major part 7 as shown in FIGS. 3, 4, 6 and 10 has a lubrication port 29 at widthwise middle area thereof while the spacer part 6 has the lubricant path 31 in opposition to the lubrication port 29. The construction the lubricant path 31 getting hydraulic pressure from the lubricant is made on the side of the spacer part 6 is much preferable to keep grease or lubricating oil against leakage. Moreover, the lubricant path 31 extends from a middle area facing the lubrication port 29 towards sidewise opposite return passages 15, followed by hugging around the spigots 9 along a curved side near to the track rail 1 to reach ingresses of the return passages 15 and the turnaround passages 14. Thus, the ceiling area 60 of the end cap 4 is protected from contamination with lubricant. The lubricant path 31 defined inside the end cap 4 by combination of the end cap major part 7 with the spacer part 6 is advantageous to prevention of lubricant leakage. The end caps 4 are made of synthetic resin stained blue, for example aqua-blue, different from the carriage 3 and also constructed maintenance-free while ready for sliding movement with accuracy.

Figure 18:
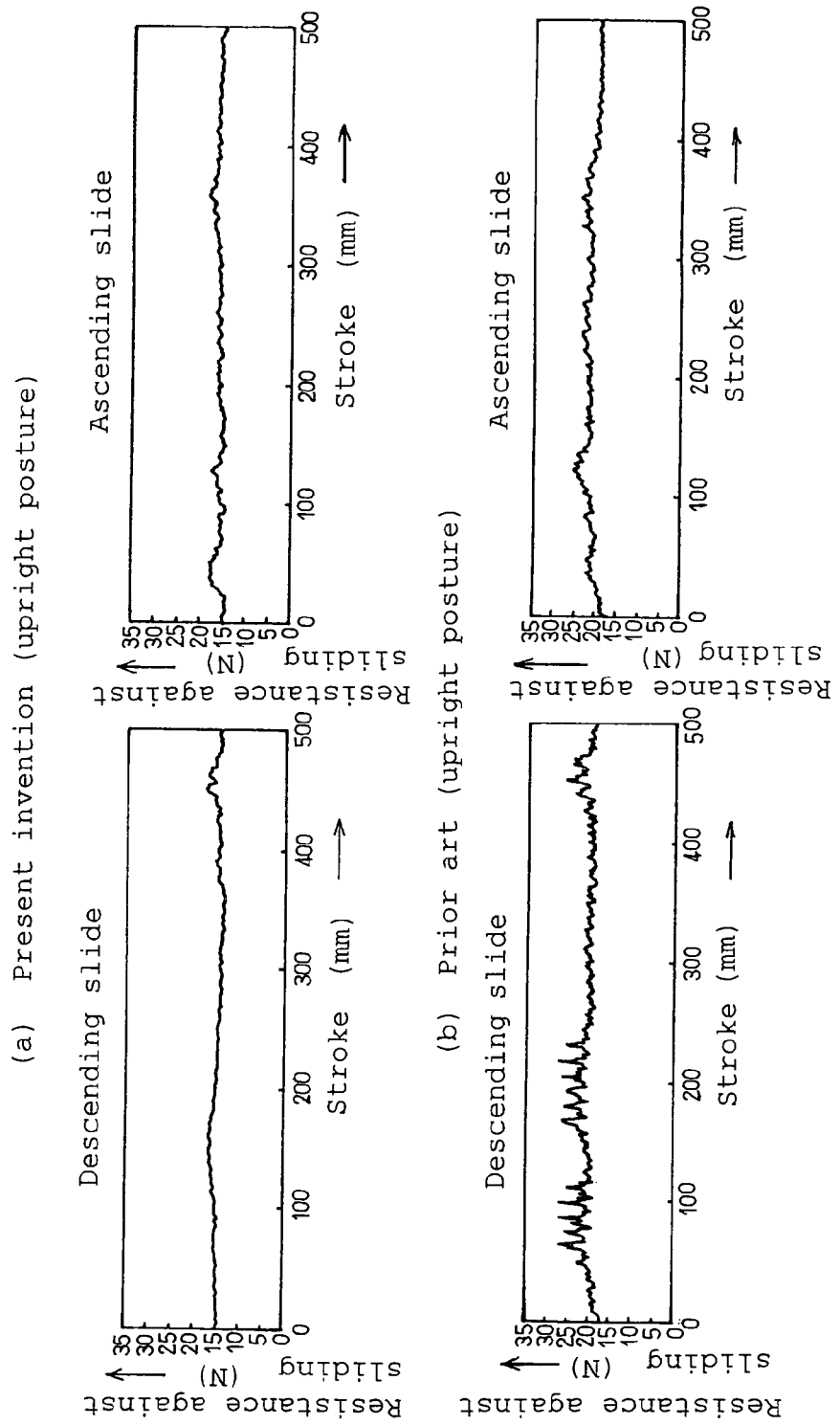
FIG. 18 is a graph showing test results demonstrated in sliding performance in the present invention compared with the prior art.

There are shown in FIG. 18 test results demonstrated in the linear motion guide unit of the present invention in comparison with the prior linear motion guide unit. The test results are measured in frictional resistance encountered when the track rail 1 especially stands up straight or linear motion guide unit lies in an upright posture. In FIG. 18, a horizontal axis represents a length (mm) of moving stroke of the slider 2 while a vertical axis is a resistance (N) encountered when the slider 2 slides over the track rail 1. The graphs with (a) are in the linear motion guide unit of the present invention while the graphs with (b) are in prior art. The graphs seen to the left represent when the slider 2 moves downwards while the graphs seen to the right represent when the slider 2 moves upwards. With the linear motion guide unit of the present invention, as understood from FIG. 18, it was confirmed that the slider 2 was allowed to slide with more smoothness as shown in (a) than in the prior art shown in (b), even when sliding downwards or descending. With the linear motion guide unit of the present invention, thus, the slider 2 is permitted to well slide over the track rail 1 with high sliding velocity and high cyclic motion even with long-lasting maintenance-free operation, no matter whether the linear motion guide unit works in any posture or geography.

What is claimed is:

1. A linear motion guide unit comprising:
    a track rail having lengthwise sides and defining a centerline along the length thereof, and being provided on both lengthwise sides thereof with first raceway grooves,
    a slider that fits over and conforms to the track rail to move lengthwise along the track rail, the slider comprising
    a carriage having second raceway grooves in opposition to the first raceway grooves to define races between the respective first and second raceway grooves, and return passages extending in parallel with the races, each return passage being parallel to its respective race and being closer to the centerline of the track rail than the respective race such that a distance between the return passages is smaller than a distance between the races,
    end caps being attached to forward and aft ends of the carriage,
    each end cap having turnaround passages connected between each race and its respective return passage, to form a circulating circuit, and a plurality of rolling balls disposed in each circulating circuit;
    wherein a centerline of each of the turnaround passages extends from a center of the race to a center of the return passage, the centerline of the turnaround passages forming a 180 degree semicircular arc having a constant radius of curvature when viewed in the sliding direction of the slider,
    wherein each end cap comprises an end cap major part and a spacer part that fits into the end cap major part, each spacer part having a pair of curved grooves to form inward halves of the turnaround passages when the spacer part is fitted in the respective end cap major part and each end cap major part having a pair of curved grooves to form outward halves of the turnaround passages when the spacer part is fitted in the respective end cap major part, so that each of the turnaround passages is formed by one of the curved grooves of the end cap major part and a corresponding one of the curved grooves of the spacer part when the spacer part is fitted in the end cap major part,
    wherein each end cap major part comprises mating depressions, and each spacer part comprises mating edges configured to engage the mating depressions of the end cap major part when each spacer part is fitted in the respective end cap major part to thereby keep the outward curved groove of the end cap major part and the inward curved groove of the spacer part in opposing relation with each other, the mating depressions in the end cap major part being rounded at their ends joining together with the return passage and the load race, and mating edges of the spacer part being rounded at their ends joining together with the return passage and the load race,
    wherein the curved groove of the end cap major part and the corresponding curved groove of the spacer part come into mating with each other out of the centerline of each of the turnaround passages, the curved groove of the end cap major a that forms outward half of the turnaround passage being larger in depth with respect to the centerline of the turnaround passage than the curved groove of the spacer cart that forms the inward of the turnaround passage,
    and wherein the carriage further comprises holes into which a tubular members impregnated with lubricant are fitted, and each end cap further comprises integral spigots configured, after the mating edges of the spacer part have come into engagement with the mating depressions of the end cap major part, to extend into the hole and come into abutment against ends of the tubular members, thereby communicating with the tubular members to complete each of the return passages.

2. The linear motion guide unit constructed as defined in claim 1, wherein the end cap major part has a lubrication port and the spacer part has a lubricant path disposed opposing the lubrication port, and wherein the lubricant path of the spacer part is formed to extend around the integral spigots, to reach the turnaround passages.

* * * * *